Patented Feb. 26, 1946

2,395,440

UNITED STATES PATENT OFFICE 2,395,440

INSECTICIDAL AND FUNGICIDAL COMPOSITIONS

Arthur Donald Ainley and William Harris Davies, Blackley, Manchester, England, assignors to Imperial Chemical Industries Limited, a corporation of Great Britain No Drawing. Application May 6, 1941, Serial No. 392,174. In Great Britain May 8, 1940

20 Claims. (Cl. 167—22)

This invention relates to insecticidal and fungicidal compositions and their manufacture.

More particularly it relates to compositions containing as an active ingredient a chemical product obtainable by the interaction of an ammonium aryldithiocarbamate and formaldehyde as further defined below.

The said interaction products are the products obtainable by treating in aqueous medium, 1 or more moles of formaldehyde with 1 mole of an ammonium aryldithiocarbamate, which may have been prepared in the aqueous medium before the addition of the formaldehyde, and which is of the general formula $RNH.CS.S.NH_4$, where R stands for phenyl, nitrophenyl, chlorophenyl, methoxyphenyl, tolyl, or naphthyl. They are solids, which are, when free from colored contaminating matter, white or pale yellow in color, insoluble in water, and soluble or partly soluble in organic solvents such as pyridine, acetone and ethyl alcohol, and which melt with decomposition upon heating. The products differ in composition not only according to the ammonium aryldithiocarbamate from which they have been obtained but also according to the proportion of formaldehyde which has been used, and they are not pure individual compounds. With most of the ammonium aryldithiocarbamates, including ammonium phenyldithiocarbamate, 1 mole of the carbamate will combine with 2 moles of formaldehyde if 2 are present. The products increase in toxicity if more than 2 moles of formaldehyde are used in the treatment, but the yields of products do not increase proportionately. The ammonium aryldithiocarbamate may be prepared in the aqueous medium before the addition of the formaldehyde from an alkali metal salt of the dithiocarbamate and an inorganic ammonium salt, e. g., ammonium chloride. Alternatively it may be made by interacting an amine of general formula $RNH_2$ (where R stands for the same as before) carbon disulphide and ammonia. Being prepared from inexpensive starting materials, e. g. aniline, carbon disulphide, ammonia and formaldehyde, and also being obtained in good yield, the products themselves are inexpensive and so are the insecticidal and fungicidal preparations which are made from them according to this invention. This is a great advantage in the invention especially as regards preparations for the large scale destruction of locusts.

The compositions of the invention comprise as active insecticidal or fungicidal ingredient a formaldehyde-ammonium aryldithiocarbamate reaction product as defined above and at least one other ingredient which is suitable for an insecticidal or fungicidal composition and which is either (a) an inert pulverulent diluent or (b) in the case of insecticidal compositions an insect-bait material or (c) an aqueous diluent in which the formaldehyde-ammonium aryldithiocarbamate product is dispersed or suspended and which also contains an adjuvant.

Inert pulverulent diluents such as talc, clay, chalk and kieselguhr may be used, and if desired, sticking or dust-binding agents, or wetting, spreading or dispersing agents can be used in addition. By choice of suitable ingredients, dry compositions are obtained, which will disperse readily in water to give dispersions suitable for use as fungicidal foliage sprays. Such dry compositions are obtained when, for example, the active agent is incorporated with a colloidal clay such as a bentonite and a wetting agent.

For compositions suitable for use as insecticides, the active ingredients may be mixed with materials which are commonly employed in the compounding of baits for insects, such as foodstuffs which are palatable to the insects. These include cereals and cereal husks, cellulosic materials, e. g. paper or sawdust, cotton seed meal, and animal refuse. Such foods may be made more attractive by the addition of, for example, molasses, amyl acetate, and salt. (See Wardle and Buckle: The Principles of Insect Control, Manchester University Press, 1933, pages 206–7.) The active materials are particularly suitable for compositions for the large scale destruction of locusts.

The active materials can also be made into suspensions or dispersions in water with the aid of suitable dispersing agents, with the addition, if desired, of wetting and penetrating agents, or materials suitable for promoting the adhesion of the material to foliage after spraying. Sprays containing 0.15% of active agent can be used on wallflowers, hollyhocks, asters, annual carnations, sweet peas, tomato plants and cucumber plants without damaging the foliage.

The results of tests carried out on the efficacy of the compositions in the destruction of locusts are included in what follows. Tests on their efficacy as fungicides show that they prevent the growth of *Fusarium graminearum* and *Penicillium digitatum* in Capex-Dox media when present to the extent of 1 part of active agent in 12,500 parts of the medium.

The following examples in which parts are by weight illustrate but do not limit the invention.

Example 1

50 parts of an interaction product of ammonium phenyldithiocarbamate and formaldehyde, which has been prepared as described below, are mixed by grinding with 50 parts of talc. The resulting dust is suitable for incorporation with other ingredients to make a poison bait. It may be made into a ground bait for poisoning locusts in the following way. 1 part of the dust is mixed with 28 parts of bran. 1 part of molasses is then mixed in. Finally 28 parts of water are added and the whole is intimately mixed to give a friable mass suitable for distribution over the ground.

The above interaction product is made as follows:

37.1 parts of ammonium phenyldithiocarbamate are dissolved in 400 parts of water, cooled to 10° C. stirred and a solution of 98 parts of 36.9% aqueous formaldehyde in 1000 parts of water run in over 45 minutes, the temperature of the mixture being maintained at 10° C. by the addition of ice. A white solid is precipitated. After stirring for several hours, the white solid is filtered, washed with water until free from formaldehyde and dried at 30–35° C. The product (36.4 parts) shrinks at 88–90° C. and melts with decomposition at 140–150° C.

Example 2

25 parts of an interaction product of aniline, carbon disulphide, ammonia and formaldehyde, which has been prepared as described below, are mixed with 39 parts of the colloidal clay known as bentonite, 25 parts of kieselguhr and 10 parts of sodium chloride. 1 part of a dispersing agent consisting of a highly sulphonated oleic acid is then added and the whole is initimately mixed to yield a dry powder, which disperses readily in water to give a dispersion suitable for use as a fungicidal foliage spray.

The interaction product mentioned above is made as follows:

A mixture of 94.3 parts of carbon disulphide, 158.5 parts of concentrated aqueous ammonia ($d=0.88$) and 180 parts of water is stirred and 101.6 parts of aniline are run in during 15 minutes. After stirring for 2 hours, 2000 parts of water are added and the mixture is stirred until a substantially clear solution is obtained. This solution is then run into 1034 parts of 36.9% aqueous formaldehyde cooled to 10° C. with good agitation, ice being added to the reaction mixture to keep the temperature at 10° C. After stirring for 1 hour the mixture is left to stand for 12 hours, the white solid is then filtered, washed well with water and dried at 30–35° C. The weight of product so obtained is 220 parts; this product softens at 98° C., and melts with decomposition at 140–145° C.

In making the product of Example 1, 6 moles of formaldehyde are interacted with 1 of ammonium phenyldithiocarbamate. Similar products can be made by using, for example, 2 and 3 moles of formaldehyde instead of 6.

The outstandingly high toxicity of these products as insecticides for the destruction of locusts can be seen from the table below, which gives the results of trials carried out in comparison with sodium arsenite, which is one of the most effective of the known locust poisons. Locusts, namely, *Locusta migratoria migratorioides*, 3rd and 4th instar Rappers, were allowed to feed on baits prepared by the processes of Examples 1 and 2 from products obtained using different molecular proportions of formaldehyde.

| Interaction product of formaldehyde and ammonium phenyldithiocarbamate. Number of moles of formaldehyde to 1 mole of carbamate. | Mean mortality after— | |
|---|---|---|
| | 23 hours | 43 hours |
| 2 | 40 | 100 |
| 3 | 67 | 100 |
| 4 | 90 | 100 |
| Sodium arsenite | 8 | 71 |

Similar bait trials were carried out against crickets (*Gryllus domesticus*). The interaction product from ammonium phenyldithiocarbamate and 3 moles of formaldehyde gave a 90% kill of this insect in 2 days, as compared with a kill of 69% with sodium arsenite under similar conditions.

Example 3

50 parts of an interaction product of ammonium p-chlorophenyldithiocarbamate and formaldehyde, which has been prepared as described below, are mixed by grinding with 50 parts of talc. The resulting dust is suitable for incorporation with other ingredients to make a poison bait as described in Example 1.

The above interaction product is made as follows:

36 parts of ammonium p-chlorophenyldithiocarbamate are dissolved in 750 parts of water, cooled to 0° C. by the addition of ice, stirred and a mixture of 75.6 parts of formaldehyde (40%) and 75.6 parts of water added slowly during 25 minutes. A pale cream coloured precipitate is formed immediately and gradually increases in amount during the addition of the diluted formaldehyde. After stirring for 20 hours the product is separated, washed with water and dried in air. 35.6 parts of product are obtained, softening at 82–84° C. and decomposing 88–89° C.

Example 4

50 parts of an interaction product of ammonium α-naphthyldithiocarbamate and formaldehyde, which has been prepared as described below, are mixed by grinding with 50 parts of talc. The resulting dust is suitable for incorporation with other ingredients to make a poison bait as described in Example 1.

The above interaction product is made as follows:

28 parts of ammonium α-naphthyldithiocarbamate are dissolved in 300 parts of water, cooled to 0° C. by the addition of ice, stirred and a mixture of 57 parts of formaldehyde (40%) and 57 parts of water added slowly during 10 minutes. A pale cream product is precipitated immediately. After stirring for 18 hours the solid product is filtered, washed with water and dried in air. 27.1 parts of product are obtained which decompose at 94–96° C. after previous shrinking.

Having now particularly described and ascertained the nature of our said invention and in what manner the same is to be performed, we declare that what we claim is:

1. An insecticidal and fungicidal composition containing as an essential active ingredient a formaldehyde-ammonium aryl dithiocarbamate interaction product obtained by reacting formaldehyde with an ammonium aryl dithiocarbamate having the formula $RNH \cdot CS \cdot S \cdot NH_4$ in which R is aryl, in the proportions of at least one mole and not more than 6 moles of formaldehyde for each mole of ammonium aryl dithiocarbamate in a cooled aqueous solution, and a carrier therefor.

2. An insecticidal and fungicidal composition according to claim 1 in which R is phenyl.

3. An insecticidal and fungicidal composition according to claim 1 in which the proportions are more than 2 and not more than 6 moles of formaldehyde for each mole of ammonium aryl dithiocarbamate.

4. An insecticidal and fungicidal composition according to claim 1 in which R is phenyl and the proportions are more than 2 and not more than 6 moles of formaldehyde for each mole of ammonium aryl dithiocarbamate.

5. An insecticidal and fungicidal composition according to claim 1 in which the proportions are 2 moles of formaldehyde for each mole of ammonium aryl dithiocarbamate.

6. An insecticidal and fungicidal composition according to claim 1 in which R is phenyl and the proportions are 2 moles of formaldehyde for each mole of ammonium aryl dithiocarbamate.

7. An insecticidal and fungicidal composition according to claim 1 in which the proportions are 1 mole of formaldehyde for each mole of ammonium aryl dithiocarbamate.

8. An insecticidal and fungicidal composition according to claim 1 in which R is phenyl and the proportions are 1 mole of formaldehyde for each mole of ammonium aryl dithiocarbamate.

9. An insecticidal and fungicidal composition according to claim 1 in which the proportions are 4 moles of formaldehyde to each mole of ammonium aryl dithiocarbamate.

10. An insecticidal and fungicidal composition according to claim 1 in which R is phenyl and the proportions are 4 moles of formaldehyde to each mole of ammonium aryl dithiocarbamate.

11. The method of protecting material subject to attack of insects and fungi which comprises applying to such material a formaldehyde-ammonium aryl dithiocarbamate interaction product obtained by reacting formaldehyde with an ammonium aryl dithiocarbamate having the formula $RNH \cdot CS \cdot S \cdot NH_4$ in which R is aryl, in the proportions of at least one mole and not more than 6 moles of formaldehyde for each mole of ammonium aryl dithiocarbamate in a cooled aqueous solution.

12. The process according to claim 11 in which R is phenyl.

13. The method of protecting material subject to attack of insects and fungi which comprises applying to such material a formaldehyde-ammonium aryl dithiocarbamate interaction product obtained by treating in aqueous solution formaldehyde with an ammonium aryl dithiocarbamate having the formula $RNH \cdot CS \cdot S \cdot NH_4$ in which R is aryl, in the proportions of more than 2 and not more than 6 moles of formaldehyde for each mole of ammonium aryl dithiocarbamate.

14. The process according to claim 13 in which R is phenyl.

15. The process according to claim 11 in which the proportions are 2 moles of formaldehyde for each mole of ammonium aryl dithiocarbamate.

16. The process according to claim 11 in which R is phenyl and the proportions are 2 moles of formaldehyde for each mole of ammonium aryl dithiocarbamate.

17. The process according to claim 11 in which the proportions are 1 mole of formaldehyde for each mole of ammonium aryl dithiocarbamate.

18. The process according to claim 11 in which R is phenyl and the proportions are 1 mole of formaldehyde for each mole of ammonium aryl dithiocarbamate.

19. The process according to claim 11 in which the proportions are 4 moles of formaldehyde to each mole of ammonium aryl dithiocarbamate.

20. The process according to claim 11 in which R is phenyl and the proportions are 4 moles of formaldehyde to each mole of ammonium aryl dithiocarbamate.

ARTHUR D. AINLEY.
WILLIAM H. DAVIES.